March 15, 1932. H. J. McDEVITT 1,849,532
PISTON RING COMPRESSOR
Filed Feb. 18, 1931   3 Sheets-Sheet 1

INVENTOR.
HENRY J. McDEVITT
BY
*A. D. Caesar*
ATTORNEY.

March 15, 1932. H. J. McDEVITT 1,849,532
PISTON RING COMPRESSOR
Filed Feb. 18, 1931 3 Sheets-Sheet 2
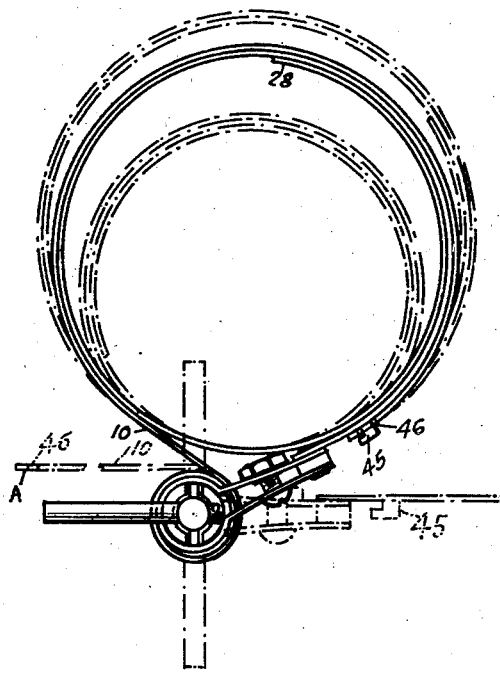
FIG. 6
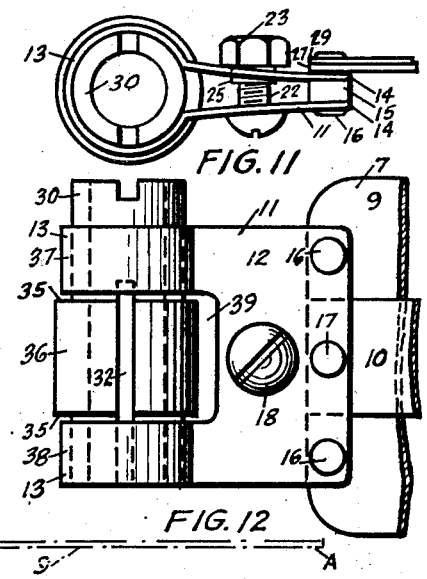
FIG. 11
FIG. 12
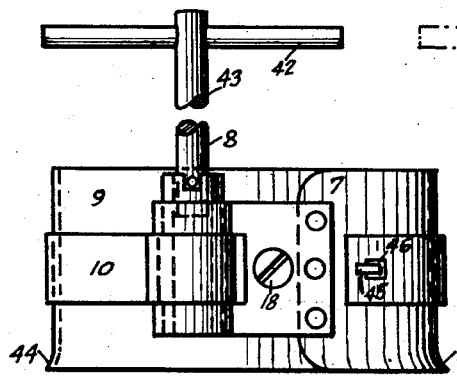
FIG. 7
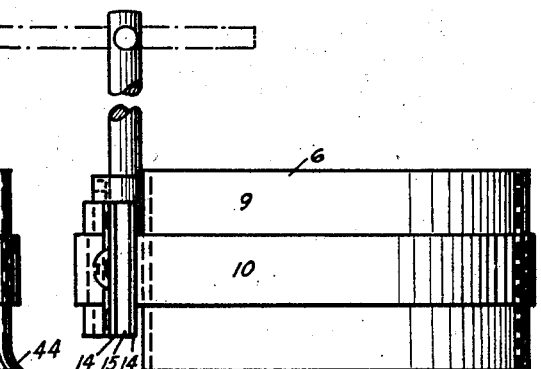
FIG. 8
INVENTOR.
HENRY J. McDEVITT
BY
A. D. Caesar
ATTORNEY.

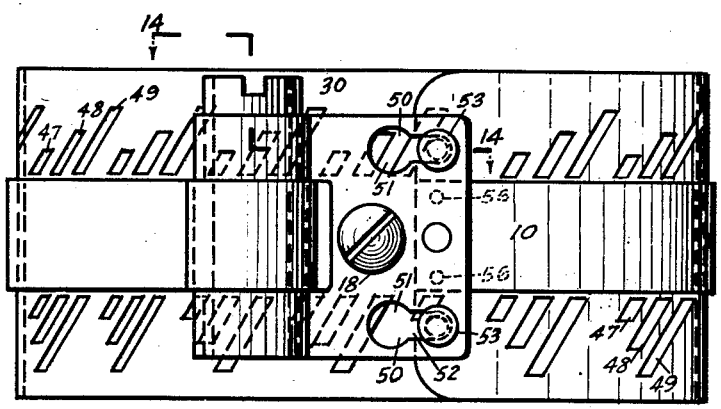
FIG. 13
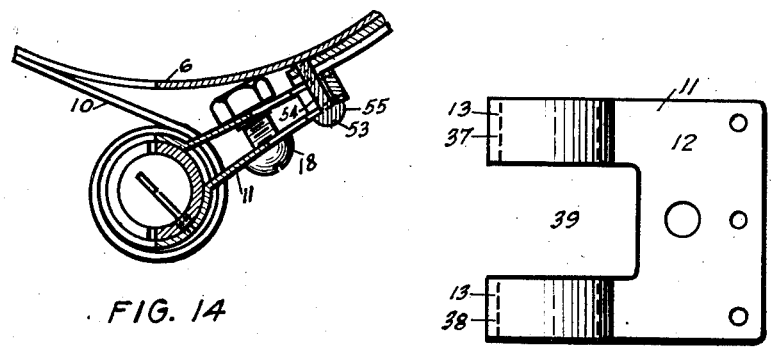
FIG. 14
FIG. 9
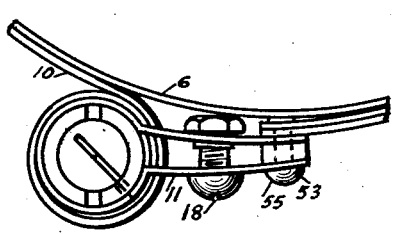
FIG. 15
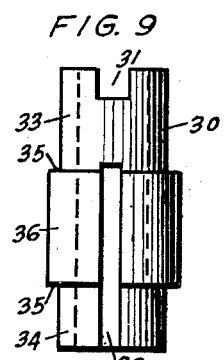
FIG. 10

Patented Mar. 15, 1932

1,849,532

UNITED STATES PATENT OFFICE

HENRY J. McDEVITT, OF PHILADELPHIA, PENNSYLVANIA, ASSIGNOR TO AIRCRAFT SPECIALTIES, INC., A CORPORATION OF DELAWARE

PISTON RING COMPRESSOR

Application filed February 18, 1931. Serial No. 516,604.

This invention relates to piston ring compressors and has for its object the production of a new and improved compressor for piston rings.

More particularly stated one of the objects of this invention is to produce a piston ring compressor so constructed that it compresses the rings on pistons of varying sizes.

Another object of this invention is to produce a piston ring compressor which shall be easy to manufacture, assemble and produce.

These as well as other objects of this invention and the advantages arising therefrom will become clear from the following description and the drawings which form a part thereof.

In the drawings Figure 1 is a perspective view showing my compressor in position upon a piston in the act of being inserted into the cylinder, the piston rod and a portion to the cylinder being broken away.

Figure 6 is a top view of a modified compressor, with the full lines showing the compressor in one position and the dot and dash lines showing the compressor in a contracted position, in an expanded position and the full open position.

Figure 7 is a front view of the compressor shown in Figure 6.

Figure 8 is a side view of a modified compressor.

Figure 9 is a front view of the spool retainer per se.

Figure 10 is a front view of the snubbing spool per se.

Figure 1:
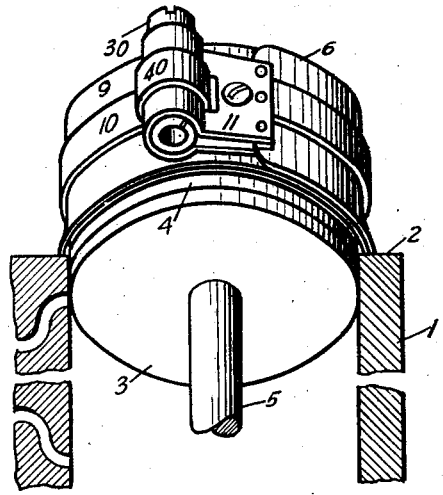

Figure 11 is a top view showing the assembly of the snubbing spool, the spool retainer and brake. The tension and compression bands are attached to the spool retainer and brake. The tension band has not been attached to the snubbing spool.

Figure 12 is a front view of the disclosure shown in Figure 11.

Figure 13 is a front view of a modified compressor.

Figure 14 is a section taken along the line 14—14 of Figure 13.

Figure 15 is a top view of a compressor showing the fragment including the snubbing spool, spool retainer and brake. The said view differing from Figure 14 in the fact that the modified spool retainer and brake are shown.

Referring more particularly to the drawings, wherein similar reference numerals denote similar parts, reference numeral 1 denotes a cylinder having a top wall 2. Reference numeral 3 denotes a piston having one or more piston rings 4. The piston rod 5 is shown attached to the piston. The cylinder, the piston, the piston rings and the piston rod are well known in the art and in and of themselves do not constitute a part of my invention and for that reason will not be further described.

The piston ring compressor 6 is composed of a body setcion 7 and a key member 8.

The body member 7 of the compressor 6 is composed of a compression band 9, a tension band 10, a brake and spool retaining member 11, a snubbing spool 30 and a take-up and bolt 18.

The brake and spool retaining member 11 is composed of a body portion 12 terminating at one end in a U shaped circular spool retaining section 13. The free ends 14 of the body member 12 of the brake and spool retaining member 11 are separated by a bar plate 15 and are connected to the free ends 27 and 29 of the tension band 10 and compression band 9 respectively by means of rivets 16 and 17.

The take-up and bolt 18 extends through a suitable aperture in the body member 12 of the brake and spool retaining member 11. The member 18 is composed of a screw 19 and a nut 20. The screw 19 is composed of a head portion 21 and a body portion 22. The nut 20 has a shoulder 25 formed thereon which fits into a suitable aperture formed in the brake and spool retaining member 11.

In the brake and spool retaining member 11, the upper member 37 and the lower member 38 together combine to form the U shaped circular spool retaining section 13 and are adapted to receive the upper end 33 and the lower end 34 respectively of the snubbing spool 30. The snubbing spool 30 has formed thereon a central member 36 which terminates in the shoulders 35, a slot 31 which receives the gripping pins 43 of the key 8, and a slot 32 which receives the free end of the tension band 10.

Figure 2:
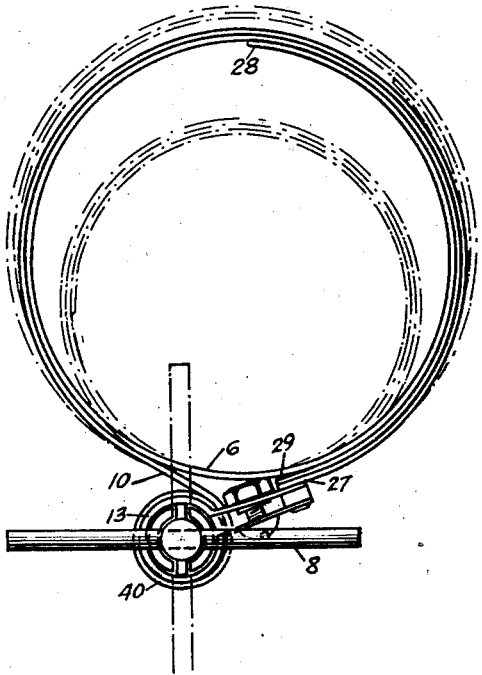
Figure 2 is a top view of the compressor per se, the full lines showing the compressor in one position and the dot and dash lines showing the compressor in a contracted and expanded position.
Figure 4:
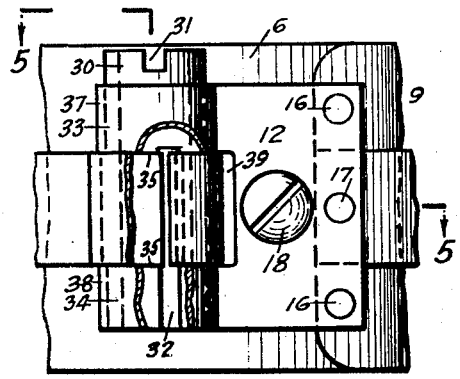
Figure 4 is an enlarged view of that portion of the compressor constituting the snubbing spool, spool retainer and brake, showing the mechanism.
Figure 3:
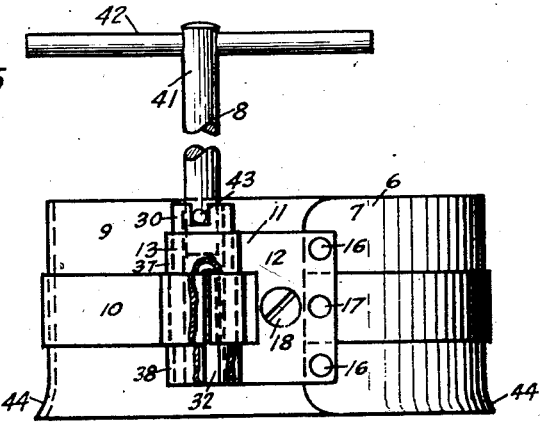
Figure 3 is a front view of the compressor shown in Figure 2.
Figure 5:
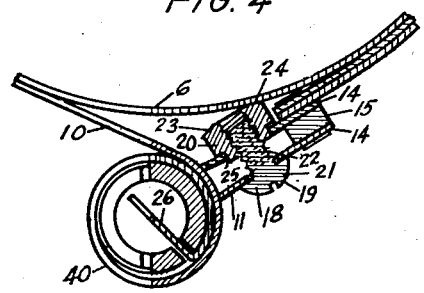
Figure 5 is a section taken along the line 5—5 of Figure 4.

Although the method of assembly and operation of the device herein described is believed to be obvious from the foregoing disclosure, yet, for the purpose of obviating any possible misunderstanding, the following detailed description is here given:

In assembling the device, we start with the flat compression band 9, flat tension band 10 and brake and spool retaining member 11, a take-up nut and bolt 18 and a snubbing spool 30. The snubbing spool 30, shown in Figure 9, is placed within the brake and spool retaining member 11 in such a manner that the upper portion 33 and the lower portion 34 of the snubbing spool are received within the upper and lower members 37 and 38 respectively of the spool retaining section 13. The free ends 27 and 29 of the tension band 10 and the compression band 9, respectively, and the spacing bar 15 are placed together and riveted together by means of rivets 17 and 16, as clearly shown in Figures 1, 3, 4, 5, 11 and 12. It is to be noted that the rivet 17 joins the tension and compression bands to the brake and spool retaining member 11, whereas the rivets 16 join only the compression band 9 to the brake and spool retaining member 11 due to the fact that the tension band 10 is narrower than the compression band 9. The screw 19 and the nut 20 of the take-up nut and bolt 18 are now assembled to assume the position clearly shown in Figures 5 and 11. The free end 28 of the compression band 9 is now turned inwardly so that the compression band 9 assumes the position shown by the full or dot and dash lines shown in Figures 2 or 6, and the free end 26 of the tension band 10 is placed within the slot 32 of the snubbing spool 30, assuming the position clearly shown in Figure 5. The key 8 is now inserted into the snubbing spool 30 in such a manner that the lower end of the body member 41 of the said key extends into the aperture formed in the tubular portion of the snubbing spool 30 and that the gripping pins 43 of the said key engage the key-slots 31 formed in the said snubbing spool. The key is now turned in the proper direction with the result that the tension band 9 is wound upon the portion 36 of the snubbing spool 30 forming thereon the layers 40 (as shown clearly in Figures 1, 2, 3, 4, 5, 6, 7, 8, 13, 14 and 15).

Continued turning of the key 8 results in the winding of more and more of the tension band 10 upon the member 36 of the snubbing spool 30. This results in the contraction of the diameter of the tension band which in turn causes contraction of the diameter of the compression band 9 which can be made to assume positions of varying diameter, such as are clearly shown in Figures 2 and 6.

To operate the piston ring compressor it is only necessary to insert the key 8 into the snubbing spool 30 and turn the key in the proper direction necessary to make the compression band 9 of a diameter somewhat greater than that of the piston and piston rings which are to be compressed. The compressor is then placed around the piston and the rings and the key 8 is turned in the proper direction necessary to reduce the diameter of the compression band 9 to the diameter of the piston itself, thus compressing the piston rings 4. The piston and compressor as a unit are then placed in the position shown in Figure 1 and the piston is pushed downwardly. It is to be noted that while the upper portion of any one piston ring is still held in its compressed position by the compressor 6, the lower portion in its compressed position is received in the cylinder 1. It is obvious that any further pressure on the piston will result in the piston and the piston ring being forced further into the cylinder, where the pressure of the cylinder replaces the pressure of the piston ring.

It is to be noted that the compression band 9 terminates at its lower end in a flare 44. When used with cylinder blocks which are not chamfered, the flare 44 serves to give the advantages resulting from a chamfered cylinder block.

If desired, the flare 44 may be entirely eliminated. A compressor without the flare is shown in Figures 8 and 13.

Piston ring compressors which may be more readily expanded into a flat band so that they may be easily removed from a piston, no matter in what position the piston may be, are shown in Figures 6, 7, 13 and 14.

The compressor in Figures 6 and 7 differs from that shown in Figures 1 to 5 inclusive in the fact that the tension band 10, instead of having one end permanently connected to the brake and spool retainer 11 by a rivet 17, is adapted to be removably connected to the hook 45, formed on the compression band 9, by means of the slot 46 formed in the tension band 10.

The method of assembly of the modification shown in Figures 6 and 7 differs from that used in connection with the disclosure shown in Figures 1 to 5 inclusive only in the fact that an end of the tension band 10 is not permanently connected to the brake and spool retainer when the bar 15 and the end 29 of the compression band 9 are attached thereto.

The modification shown in Figures 6 and 7 operates as follows:

We start with the band in the flat position shown by the dot and dash lines in Figure 7, designated by the letter A. The compression band 9 is then bent into circular form as shown by the circular full lines or the dot and dash lines in Figure 6. The tension band 10 is then bent so as to encircle the compression band 9. The bands 9 and 10 are then adjusted relatively to each other until the slot 46 in the tension band 9 has been hooked over the lug or hook 45 on the compression band 9. The key 8 is then turned in the proper direction to reduce the compression band to the diameter necessary to tighten the piston rings on the piston being prepared for insertion into a cylinder.

It is to be understood that the compressor shown in Figures 6 and 7 may be bent into its circular shape, shown by the circular full lines or dot and dash lines in Figure 6, either around a piston or dissociated from a piston. When bent into shape dissociated from a piston it is operatively united with the piston whose rings are to be compressed in the same manner as outlined in connection with the disclosure in Figures 1 to 5 inclusive.

This type of compressor is especially adapted for easy removal from constructions, such as aircraft engines, wherein it is necessary to first bolt the connecting rod and piston assembly to the crank shaft and the piston ring compressor is between the cylinder-block and crank-shaft. In such cases the compressor is left around the piston rod after the piston has been pushed into the cylinder. To remove the compressor it is only necessary to press upon the compression band 9 whereby the tension on the tension band 10 is removed and the tension band 10 may then be disconnected from the lug 45. The compression and tension bands 9 and 10 respectively then assume the flat positions shown by the dot and dash lines A in Figure 6.

Instead of using an unhooking compressor of the type shown in Figures 6 and 7, a compressor of the type shown in Figures 13 and 14 may be used.

In this type, an end of the tension band is joined to the compression band by means of rivets 56. The compression band 9 has studs 53 formed thereon. The studs 53 are composed of a body portion 54 and a head 55. The brake and spool retainer has slots 50 formed therein. The slot 50 is composed of a wide member 51 merging into a narrow member 52. The wide member 51 is wider than the head 55 of the stud 53. The narrow portion 52 is wider than the body of the stud 54 but narrower than the head of the stud 55. The snubbing spool 30 and the manner of assembling the snubbing spool with the brake and spool retaining member 11 and its associated parts are the same as that set forth in connection with the disclosure of Figures 1 to 5 inclusive.

The operative position of this type of compressor is shown in Figures 13 and 14. To detach this band from the piston rod it is only necessary to exert a pressure upon the compression band 9, with the result that the studs 53 will assume a position where the heads 55 of the studs will lie in the wide portion 51 of the slot 50. The brake and snubbing spool retaining member can now be lifted off the studs 53 since the apertures 51 are wider than the stud heads 55.

In Figure 13 are also shown a series of slots 47, 48 and 49 which permit examination of the piston-rings when compressed by the compression band 9.

In Figure 15 there is disclosed a curved brake and snubbing spool retaining band. This structure results in the snubbing spool being brought closer to the compression band 9. By varying the amount of curvature of the brake and snubbing spool retaining member 11 the distance of the snubbing spool from the compression band 9 may be varied.

The take-up nut and bolt 18 is present in all modifications and has two functions. First: In combination with the spacing bar 15 it serves to take up any wear between the snubbing spool 30 and the portion 13 of the brake member 11. All that is necessary in the event of wear is to tighten the nut 20. The shoulder 25 on the nut 20 and the head 21 of the screw 19 contact with and compress the brake member 11, thus taking up the wear. Second: The lower surface 23 of the nut 20 contacts with the compression and tension bands 9 and 10 when in the operative position, as shown at 24 in Figure 5, and serves to aid in forcing the compression band to keep its rounded shape.

The compression band 9 and the tension band 10 are made of spring steel. It is to be understood, however, that they may be made of any material having the necessary qualities of strength and resiliency.

The above disclosure is made by the way of illustration only and not by the way of limitation since many changes may be made in the devices shown without departing from the spirit of my invention. These changes can include, among other things, not only variations in the relative size of the component elements which enter into combination shown, or changes in the type of material used, but also the omission of certain parts or the replacement of certain or all of the component elements by equivalents.

For this reason it is my desire that the claims which are hereunto appended for the purpose of defining my invention should be limited only by the prior art.

Having described my invention what I claim as new and useful is:—

1. A piston ring compressor consisting of a compression band in the form of a split ring having overlapping ends to permit relative movement between the said ends, a tension band encircling the said compression band for holding the said compression band in position and determining the perimeter of the ring formed by the said compression band, and means connected to the said tension band for varying the effective perimeter of the tension band.

2. A piston ring compressor consisting of a compression band member of flexible material adapted to assume the shape of the piston which carries the piston rings to be compressed, a tension band of flexible material positioned for encircling the said compression band and holding the said compression band in position and means connected to the said tension band for changing the diameter of the circle formed by the said tension band.

3. A piston ring compressor consisting of a brake member; a compression band of flexible material which in its active position is free at one end and connected at its other end to the said brake member, the said compression band being adapted for assuming the shape of the piston which carries the rings to be compressed; winding means carried by the said brake member; and a tension band having one end connected to the said winding means, the said tension band encircling and holding the said compression band in its active position and activating the said compression band to force the said compression band to assume the shape of the piston whose piston rings are to be compressed and to exert the force necessary to compress the said piston rings.

4. A piston ring compressor consisting of a brake member; a compression band of flexible material which in its active position is free at one end and connected at its other end to the said brake member, the said compression band being adapted for assuming the shape of the piston which carries the rings to be compressed; winding means carried by the said brake member; a tension band having one end connected to the said winding means, the said tension band encircling and holding the said compression band in its active position and activating the said compression band to force the said compression band to assume the shape of the piston whose piston rings are to be compressed and to exert the force necessary to compress the said piston rings; and means for activating the said winding means whereby the diameter of the circle formed by the said tension band may be varied.

5. A piston ring compressor consisting of a brake member; a compression band of flexible material free at one of its ends and attached at its other end to the said brake member, the said compression band being adapted for assuming the shape of the piston, the rings of which are to be compressed; a snubbing spool carried by the said brake member; and a tension band having one end connected to the said brake member and the other end connected to the said snubbing spool encircling the said compression band and holding the said compression band in its active position and which when activated by the actuation of the said snubbing spool will actuate the said compression band to force the said compression band to assume the diameter of the piston whose rings are to be compressed and to exert the force necessary to compress the said piston rings.

6. A piston ring compressor consisting of a brake member; a compression band of flexible material free at one of its ends and attached at its other end to the said brake member, the said compression band being adapted for assuming the shape of the piston the rings of which are to be compressed; a snubbing spool mounted for rotation in the said brake-member; means carried by the said brake member for taking up wear between the said brake member and the said snubbing spool; and a tension band having one end connected to the said brake member and the other end connected to the said snubbing spool encircling the said compression band and holding the said compression band in its active position and which when activated by the actuation of the said snubbing spool will actuate the said compression band to force the said compression band to assume the diameter of the piston whose rings are to be compressed and to exert the force necessary to compress the said piston rings.

7. A piston ring compressor consisting of a brake member; a compression band of flexible material free at one of its ends and attached at its other end to the said brake-member, the said compression band being adapted for assuming the shape of the piston the rings of which are to be compressed, the said compression band having further a plurality of slots formed therein; a snubbing spool mounted for rotation in the said brake member; and a tension band having one end connected to the said brake member and the other end connected to the said snubbing spool encircling the said compression band and holding the said compression band in its active position and which when activated by the actuation of the said snubbing spool will actuate the said compression band to force the said compression band to assume the diameter of the piston whose rings are to be compressed and to exert the force necessary to compress the said piston rings.

8. A piston ring compressor consisting of a brake member; a compression band of flexible material free at one of its ends and attached at its other end to the said brake member, the said compression band being adapted for assuming the shape of the piston the rings of which are to be compressed, the said compression band having further a plurality of slots formed therein; a tubular snubbing spool mounted for rotation in the said brake member, the said snubbing spool having key slots formed in the upper part thereof for receiving the prongs of an actuating key and a tension band receiving slot formed in its body portion; a spacing bar carried by and separating the ends of the said brake member; a take-up nut and bolt carried by the said brake member the inner surface of the said nut being positioned for engagement with the outer surface of the said compression band when the said compression band is in the active position; and a tension band having one end connected to the said brake member and the other end resting within the said tension band receiving slot in the said snubbing spool encircling the said compression band and holding the said compression band in its active position and which when activated by the actuation of the said snubbing spool will actuate the said compression band to force the said compression band to assume the diameter of the piston whose rings are to be compressed and to exert the force necessary to compress the said piston rings.

9. A piston ring compressor consisting of a brake member; a compression band of flexible material free at one of its ends and attached at its other end to the said brake member, the said compression band being adapted for assuming in its active position the shape of the piston, the rings of which are to be compressed; a retaining lug formed on the outer surface of the said compression band; a snubbing spool mounted for rotation in the said brake member; and a tension band attached at one of its ends to the said snubbing spool and having a lug engaging aperture formed near its other end; the said tension band being adapted to encircle the said compression band in its active position and to be attached by means of the said lug aperture to the said lug formed on the said compression band; the said tension band in its attached position serving to hold the said compression band in its active position and to actuate the said compression band and to force it to assume the shape of the piston, the rings of which are to be compressed, and to exert the force necessary to compress the said rings.

10. A piston ring compressor consisting of a brake member having at least one bottle neck slot formed therein; a snubbing spool mounted for rotation in the said brake member; a flexible tension band attached at one of its ends to the said snubbing spool; a flexible compression band attached to the other end of the said tension band, the said tension band and compression band each adapted to form a straight band in its respective inactive position, the said compression band being adapted to form in its active position a circular band free at one end, and the said tension band being positioned for encircling the said compression band in its active position; a stud formed on the said compression band for engaging each of the said bottle neck slots, the heads of each of the said studs being smaller than the wide part of each of the said bottle neck slots, thus serving to admit each of the said studs into each of the said slots, and being of greater width than the narrow portion of each of the said bottle neck slots, thus serving to lock each of the said studs into each of the said slots; the said tension band, when in its active position serving to encircle the said compression band and to hold the said compression band in its active position, and, when activated in its active position by the actuation of the said snubbing spool, serving to force the said compression band to assume the diameter of the piston whose rings are to be compressed and to exert the force necessary to compress the said piston rings.

11. A piston ring compressor consisting of a brake member having at least one bottle neck slot formed therein; a snubbing spool mounted for rotation in the said brake member; a flexible tension band attached at one of its ends to the said snubbing spool; a flexible compression band, having a plurality of slots differing in length formed therein, attached to the other end of the said tension band, the said tension band and compression band each adapted to form a straight band in its respective inactive position, the said compression band being adapted to form in its active position a circular band free at one end, and the said tension band being positioned for encircling the said compression band in its active position; a stud formed on the said compression band for engaging each of the said bottle neck slots, the heads of each of the said studs being smaller than the wide part of each of the said bottle neck slots, thus serving to admit each of the said studs into each of the said slots, and being of greater width than the narrow portion of each of the said bottle neck slots, thus serving to lock each of the said studs into each of the said slots, the said tension band, when in its active position serving to encircle the said compression band and to hold the said compression band in its active position, and, when activated in its active position by the actuation of the said snubbing spool, serving to force the said compression band to assume the diameter of the piston whose rings are to be compressed and to exert the force necessary to compress the said piston rings.

12. A piston ring compressor consisting of a curved brake member; a compression band of flexible material free at one of its ends and attached at its other end to the said brake member, the said compression band being adapted for assuming the shape of the piston, the rings of which are to be compressed, the said compression band having further a plurality of slots formed therein; a tubular snubing spool mounted for rotation in the said brake member, the said snubbing spool having key slots formed in the upper part thereof for receiving the prongs of an actuating key and a tension band receiving slot formed in its body portion; a spacing bar carried by and separating the ends of the said brake member; a take-up nut and bolt carried by the said brake member, the inner surface of the said nut being positioned for engagement with the outer surface of the said compression band when the said compression band is in the active position; a tension band having one end connected to the said brake member and the other end resting within the said tension band receiving slot in the said snubbing spool encircling the said compression band and holding the said compression band in its active position and which when activated by the actuation of the said snubbing spool will actuate the said compression band to force the said compression band to assume the diameter of the piston whose rings are to be compressed and to exert the force necessary to compress the said piston rings; and a key for actuating the said snubbing spool, the said key having a body member adapted to be received within the said tubular spool and having lugs adapted to engage the said key slots formed in the said snubbing spool.

13. A piston ring compressor consisting of a compression band in the form of a split ring having overlapping ends to permit relative movement between the said ends, a tension band attached at one of its ends to the said compression band and encircling the said compression band for holding the said compression band in position and determining the perimeter of the ring formed by the said compression, and means connected to the other end of the said tension band for varying the effective perimeter of the said tension band.

In testimony whereof I hereby affix my signature.

HENRY J. McDEVITT.